United States Patent
Ferrara et al.

(10) Patent No.: US 11,227,045 B2
(45) Date of Patent: Jan. 18, 2022

(54) SYSTEM, METHOD AND APPARATUS FOR EXTRACTING USAGE-BASED FINE GRAINED PERMISSIONS

(71) Applicant: International Business Machines Corporation, Armonk, NY (US)

(72) Inventors: Pietro Ferrara, Mestre-Venice (IT); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 15/193,602

(22) Filed: Jun. 27, 2016

(65) Prior Publication Data

US 2017/0372060 A1    Dec. 28, 2017

(51) Int. Cl.
*G06F 21/44* (2013.01)

(52) U.S. Cl.
CPC ................. *G06F 21/44* (2013.01)

(58) Field of Classification Search
CPC .... G06F 21/44; G06F 17/30477; G06F 21/00; G06F 2221/00; H04L 63/20; G06Q 20/40; H04W 12/12
USPC ......... 726/1, 4, 17; 706/46; 705/44; 711/163
See application file for complete search history.

(56) References Cited

U.S. PATENT DOCUMENTS

| | | | |
|---|---|---|---|
| 7,949,637 B1 * | 5/2011 | Burke ................... | G06F 3/0605 707/655 |
| 9,965,618 B1 * | 5/2018 | Sharifi Mehr .......... | G06F 21/51 |
| 2002/0029337 A1 * | 3/2002 | Sudia ................... | G06Q 20/401 713/176 |
| 2013/0282564 A1 * | 10/2013 | Sibbald ............. | H04M 1/72525 705/39 |
| 2014/0181896 A1 * | 6/2014 | Yablokov ................ | H04L 63/10 726/1 |

(Continued)

OTHER PUBLICATIONS

Holavanalli, et al., "Flow Permissions for Android", IEEE, ASE 2013, Palo Alto, USA, pp. 652-657.

(Continued)

*Primary Examiner* — Mohammad W Reza
*Assistant Examiner* — Moeen Khan
(74) *Attorney, Agent, or Firm* — Scully, Scott, Murphy & Presser, PC; Daniel P. Morris, Esq.

(57) ABSTRACT

A fine grained permission method and system that parameterizes permissions based on an objective criterion. The method includes accessing libraries of application programs requiring a permission, automatically extracting types of the parameters and respective corresponding fields read by the libraries requiring the permission, filtering the extracted types of parameters and fields based on a usage criteria to determine a filtered type of parameter and field for the permission and storing the filtered type parameter and field for the permission in a database. A request for a permission is passed to a fine grained permission module which obtains the filtered type of parameter and field for the permission, determines a specific parameter for the permission based on the filtered type of parameter and field and parameterizes the permission using the specific parameter. Downloading of the application program is completed by limiting the permission based on the specific parameter.

6 Claims, 4 Drawing Sheets

(56) References Cited

U.S. PATENT DOCUMENTS

| | | | | |
|---|---|---|---|---|
| 2014/0258128 | A1* | 9/2014 | Lei | H04L 63/20 |
| | | | | 705/44 |
| 2015/0347743 | A1* | 12/2015 | Magee | G06F 9/468 |
| | | | | 726/21 |
| 2016/0062839 | A1* | 3/2016 | Kapoor | G06F 11/1446 |
| | | | | 707/684 |
| 2016/0110178 | A1* | 4/2016 | Ortega-Binderberger | |
| | | | | G06F 21/629 |
| | | | | 717/178 |
| 2016/0232374 | A1* | 8/2016 | Huang | G06F 9/468 |
| 2016/0321471 | A1* | 11/2016 | Krstic | G06F 21/10 |
| 2017/0076099 | A1* | 3/2017 | Yao | G06F 21/62 |

OTHER PUBLICATIONS

Shen, et al., "Information Flows as a Permission Mechanism", ASE 14, Sep. 15-19, 2014, pp. 1-12.

Hoffman, "Android's App Permissions Were Just Simplified—Now they're Much Less Secure", Jun. 11, 2014, pp. 1-5.

Hoffman, "How to Manage App Permissions on Adroid 6.0", Oct. 11, 2015, pp. 1-6.

Mell, P. et al., "The NIST Definition of Cloud Computing", NIST Special Publication 800-145, National Institute of Standards and Technology, U.S. Department of Commerce, Sep. 2011, pp. 1-7.

* cited by examiner

[A](#)

SYSTEM, METHOD AND APPARATUS FOR EXTRACTING USAGE-BASED FINE GRAINED PERMISSIONS

BACKGROUND OF THE INVENTION

This disclosure is directed to an application program permission mechanism and more particularly, to a fine grained permission mechanism.

Permissions are the mechanism adopted by information systems to specify which software and hardware parts of a system a program is allowed to access. For example, the Android® operating system adopted a coarse permission system in which a program can ask and a user can grant access all or the application will not be downloaded. Depending on the type of application, permissions can only be granted to the whole file system or all Internet resources. A coarse system, however, exposes serious limits. The readability and understanding of these permissions from end users is quite poor, and they usually tend to grant these permissions to any applications. In addition, a coarse permission system is often made by numerous types of coarse permissions. The permissions may be dynamically enforced in various ways inside the platform, at the level of the source code of the libraries or by the operating system. Recent studies showed that several thousands of methods in Android®'s API require at least one permission. Fine grained permission systems have been proposed. However, these systems arbitrarily parameterize permissions, or they introduce a complex specification language (e.g., based on mathematical logic) that cannot be understood by an average user.

SUMMARY OF THE INVENTION

In one embodiment of the invention, a fine grained permission method and system is disclosed that provides parameterized permissions based on an objective criterion. In one embodiment the parameters are chosen based on the usage of the permissions. In one embodiment, given a permission, the steps of the method include extracting automatically the types of the parameters read by libraries requiring the given permission and filtering the types that satisfy certain usage criteria. Based on the filtering, the permission is parameterized with this parameter.

In one embodiment the method starts with accessing libraries of a plurality application programs requiring a first permission. The plurality of application programs being for a specific operating system. The method may include automatically extracting types of the parameters and respective corresponding fields read by the libraries requiring the first permission. The method may include filtering the extracted types of parameters and respective corresponding fields based on a usage criteria to determine a filtered type of parameter and respective corresponding field for the permission. The method may include storing the filtered type parameter and respective corresponding field for the first permission in a database. The method may further include repeating the above steps for a plurality of permissions for a plurality of application programs for the specific operating system.

In one embodiment the method includes receiving a request for a permission required by a library of an application program running on the specific operating system. In one embodiment, the permission request is received by a mobile device. The mobile device downloads the application program using an application download module. The application program module passes permissions required by the library of the program to a fine grained permission module.

In one embodiment, the fine grained permission module obtains from the database the filtered type of parameter and respective corresponding field for the permission. The fine grained permission module determines a specific parameter for the permission based on the filtered type of parameter and respective corresponding field obtained from the database. The fine grained permission module parameterizes the permission using the specific parameter. The fine grained permission module passes the parameterized permission back to the application download module which completes downloading the application program by limiting the permission based on the specific parameter.

In another embodiment, a system includes at least one data processor connected to at least one memory that stores software instructions, where execution of the software instructions by the at least one data processor causes the system to limit application program permissions by accessing libraries of a plurality application programs requiring a first permission. The plurality of application programs being for a specific operating system. The system may include automatically extracting types of the parameters and respective corresponding fields read by the libraries requiring the first permission. The system may include filtering the extracted types of parameters and respective corresponding fields based on a usage criteria to determine a filtered type of parameter and respective corresponding field for the permission. The system may include storing the filtered type parameter and respective corresponding field for the first permission in a database. The system may further include repeating the above steps for a plurality of permissions for a plurality of application programs for the specific operating system. The system may include a mobile device which downloads the application program using an application download module. The application program module passes permissions required by the library of the program to a fine grained permission module. The fine grained permission module obtains from a database the filtered type of parameter and respective corresponding field for the permission. The fine grained permission module determines a specific parameter for the permission based on the filtered type of parameter and respective corresponding field obtained from the database. The fine grained permission module parameterizes the permission using the specific parameter. The fine grained permission module passes the parameterized permission back to the application download module which completes downloading the application program by limiting the permission based on the specific parameter.

In another embodiment, a computer program product includes software instructions on a non-transitory computer-readable medium, where execution of the software instructions using a computer causes the computer to limit application program permissions by accessing libraries of a plurality application programs requiring a first permission. The plurality of application programs being for a specific operating system. The software instructions may include automatically extracting types of the parameters and respective corresponding fields read by the libraries requiring the first permission. The software instructions may include filtering the extracted types of parameters and respective corresponding fields based on a usage criteria to determine a filtered type of parameter and respective corresponding field for the permission. The software instructions may include storing the filtered type parameter and respective corresponding field for the first permission in a database. The software instructions may further include repeating the above steps for a plurality of permissions for a plurality of application programs for the specific operating system. The software instructions may include an application program module for a mobile device which passes permissions required by the library of the program to a fine grained permission module. The fine grained permission module obtains from a database the filtered type of parameter and respective corresponding field for the permission. The fine grained permission module determines a specific parameter for the permission based on the filtered type of parameter and respective corresponding field obtained from the database. The fine grained permission module parameterizes the permission using the specific parameter. The fine grained permission module passes the parameterized permission back to the application download module which completes downloading the application program by limiting the permission based on the specific parameter.

DETAILED DESCRIPTION OF PREFERRED EMBODIMENTS

In one embodiment of the invention, a fine grained permission method and system is disclosed that provides parameterized permissions based on an objective criterion. In one embodiment the parameters are chosen based on the usage of the permissions. In one embodiment, given a permission, the steps of the method include extracting automatically the types of the parameters read by libraries requiring the given permission and filtering the types that satisfy certain usage criteria. In one example, parameters that are used by at least the 50% of the libraries requiring the permission are used to determine the parameter. Based on the filtering, the permission is parameterized with this parameter.

Figure 1:
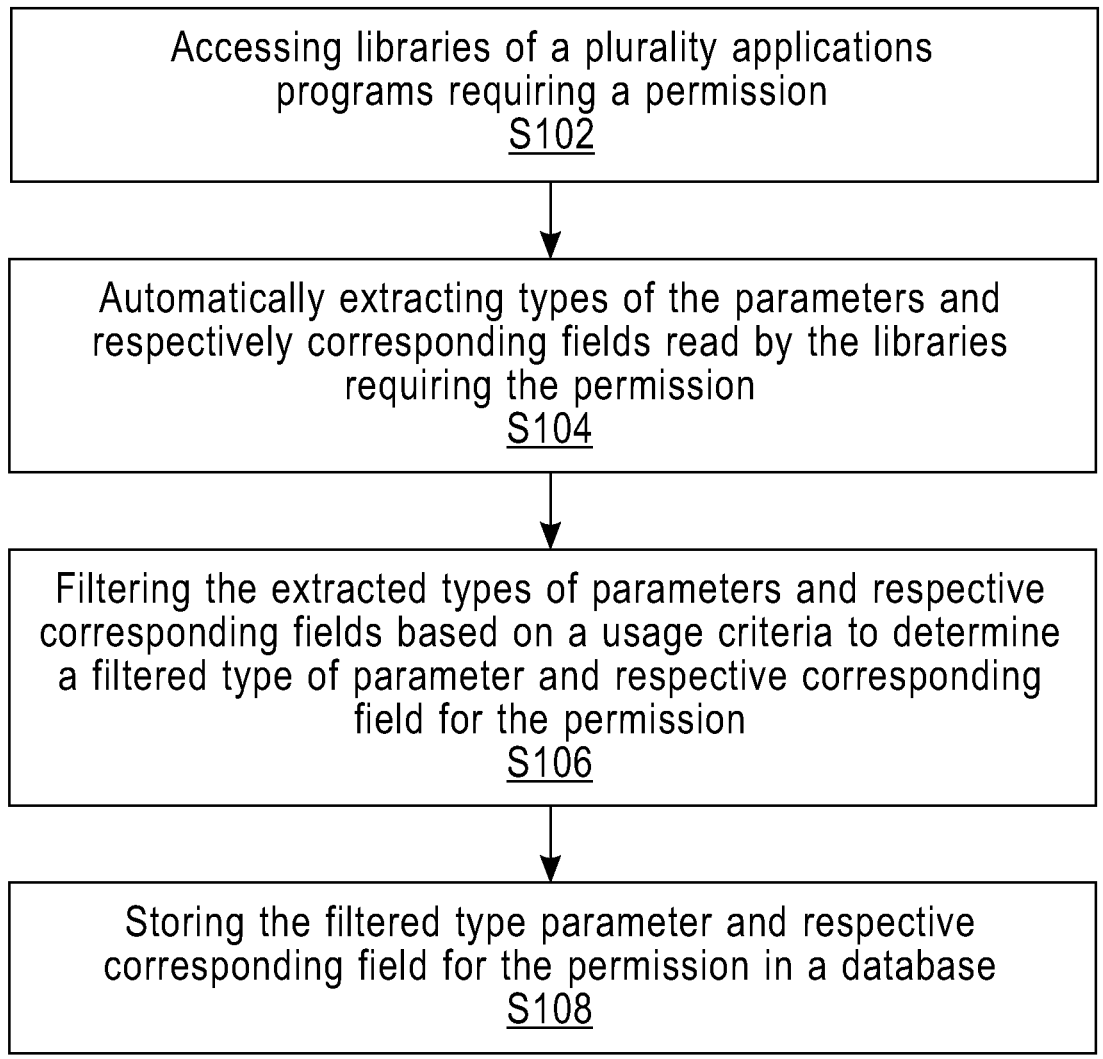
FIG. 1 is a flow chart illustrating one embodiment of the method of limiting application program permissions disclosed within this specification.

One embodiment of the method for limiting application program permissions is shown in FIG. 1. In step S102, the method starts with accessing libraries of a plurality application programs requiring a first permission. The plurality of application programs being for a specific operating system. In step S104 the method includes automatically extracting types of the parameters and respective corresponding fields read by the libraries requiring the first permission. In step S106, the method includes filtering the extracted types of parameters and respective corresponding fields based on a usage criteria to determine a filtered type of parameter and respective corresponding field for the permission. In step S108 the method includes storing the filtered type parameter and respective corresponding field for the first permission in a database.

The method may further include repeating the above steps for a plurality of permissions for a plurality of application programs for the specific operating system.

Figure 2:
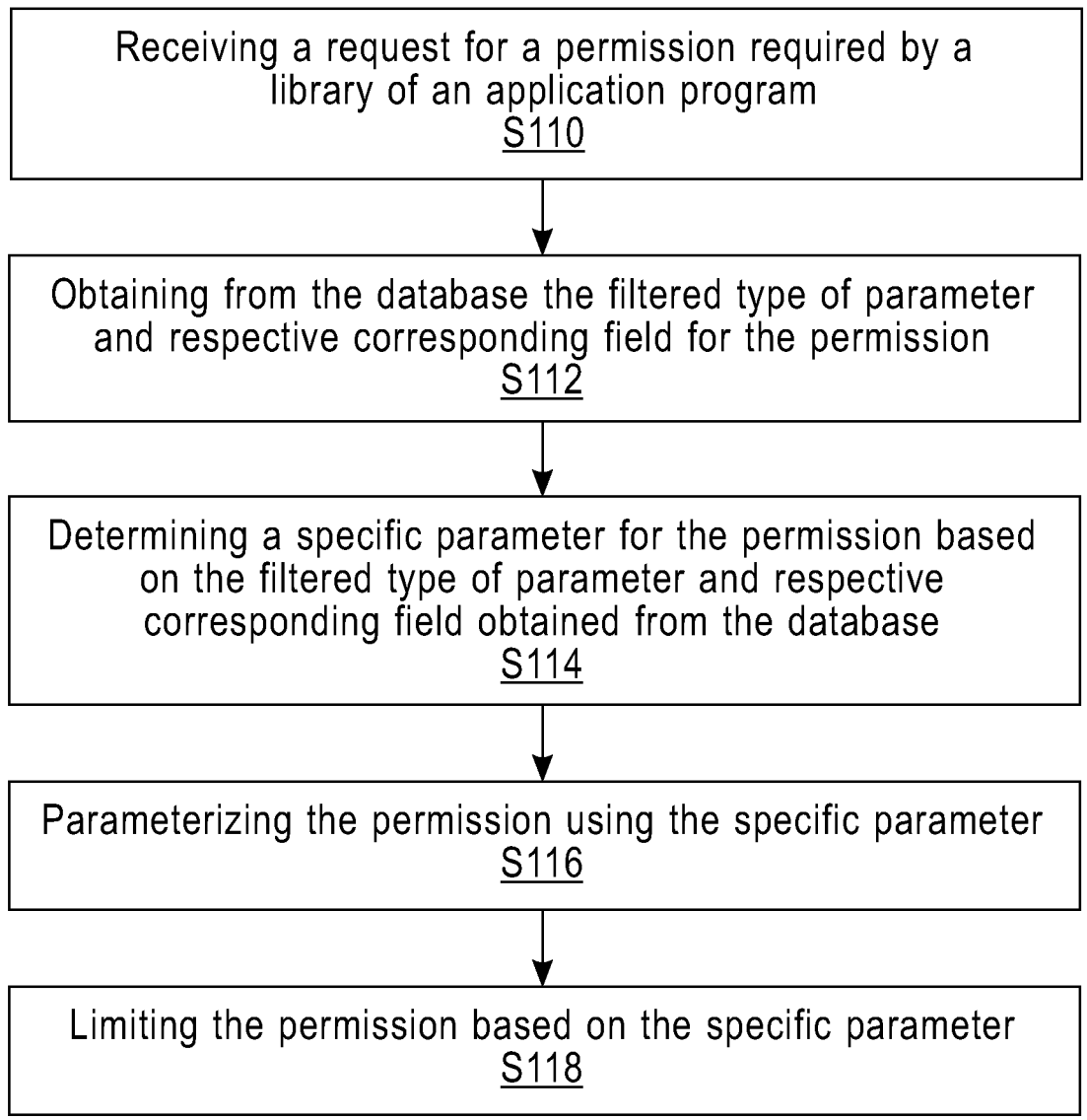
FIG. 2 is a flow chart illustrating another embodiment of the method of limiting application program permissions disclosed within this specification.
Figure 3:
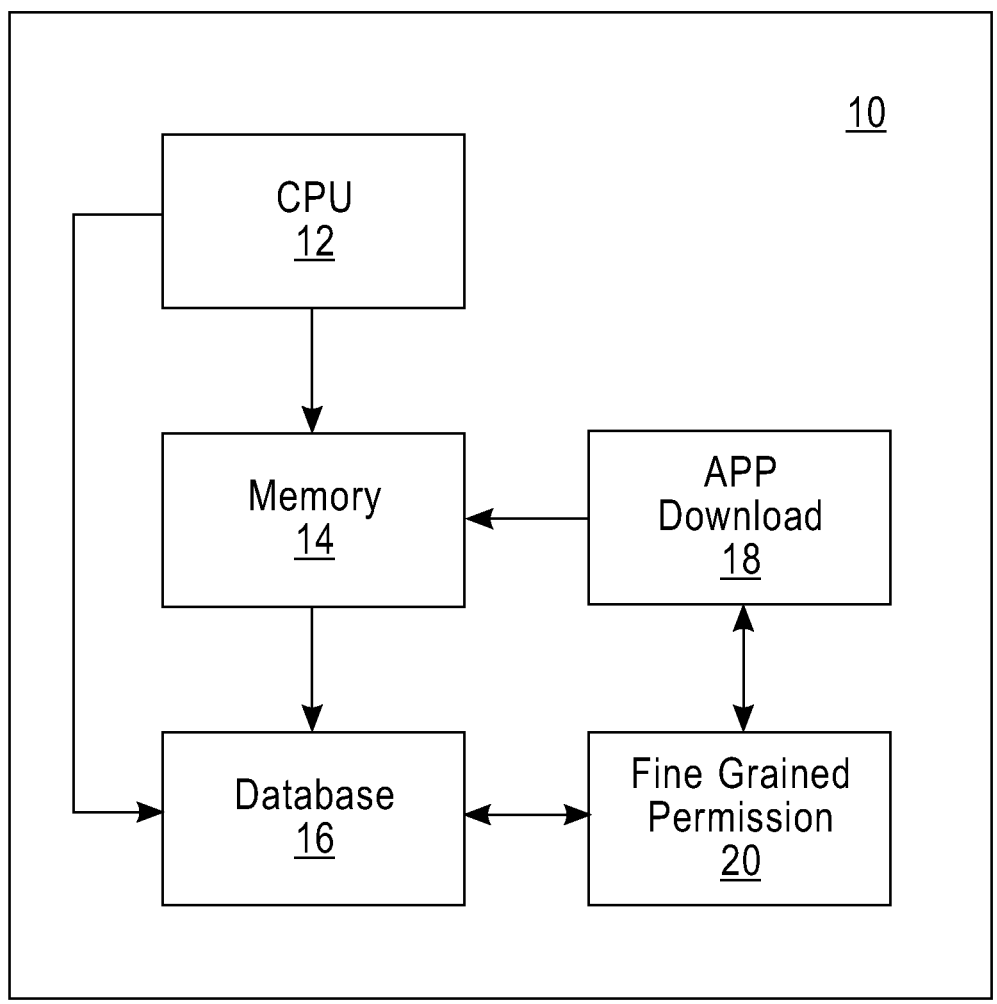
FIG. 3 is a block diagram of an exemplary mobile device suitable for implementation of the embodiments of the invention disclosed in this specification.

As shown in FIG. 2, the method of one embodiment further includes in step S110 receiving a request for a permission required by a library of an application program running on the specific operating system. In one exemplary embodiment, as shown in FIG. 3, the permission request is received by a mobile device 10. The mobile device 10 has CPU 12, memory 14, database 16 application download module 18 and fine grained permissions module 20. The mobile device 10 downloads the application program using application download module 18. The application program module 18 passes permissions required by the library of the program to the fine grained permission module 20.

In step S112, the fine grained permission module 20 obtains from the database 16 the filtered type of parameter and respective corresponding field for the permission. In step S114, the fine grained permission module 20 determines a specific parameter for the permission based on the filtered type of parameter and respective corresponding field obtained from the database 16. In step S116, the fine grained permission module 20 parameterizes the permission using the specific parameter. The fine grained permission module 20 passes the parameterized permission back to the application download module 18. In step S118, the application download module 18 completes downloading the application program by limiting the permission based on the specific parameter.

In one embodiment, the method includes determining the types of parameters and respective corresponding fields most often used by the libraries requiring the permission. In one embodiment, the method includes determining the types of parameters and respective corresponding fields used by at least a threshold percentage of the libraries requiring the permission.

In one exemplary embodiment, the method splits coarse Android® permissions into fine grained permissions by parameterizing a permission to give access only to a portion of the permission following the value of the parameter. The choice of parameters is done automatically by analyzing the Android® libraries to detect what parameters and fields are most often touched by libraries requiring a given permission. The method uses this information to drive the choice of the parameters adopted to build up parameterized Android® permissions.

One example is the internet permission. The method of this invention determines that the libraries requiring this permission (e.g., to download the content of a website) will read a URL passed as a String parameter to open a connection. The method of the invention further determines that String parameters are quite common for libraries requiring the internet permission. Therefore, for an application program that includes the internet permission in order to access the IBM website, the method of the invention will parameterize this permission with a string representing the accessed URL (www.ibm.com).

Another example is the person identifier which is usually an integer value, in the READ-WRITE_CONTACTS. By parameterizing these permissions with an integer value identifying a specific person, the method allows the program to read or write only one specific contact.

The fine grained permission system built following the method of the invention will have two major benefits. One benefit is pervasiveness, since by design the method parameterizes the permission system looking to the parameters and fields that are most often used by the libraries. Therefore, for the most part, the libraries will be in position to require a very specific permission (e.g., INTERNET(url)). A second benefit is automation, since the automatic analysis of the usage would be a strong tool to guide the evolution of permissions from one version to the other of the operating system platforms.

Figure 4:
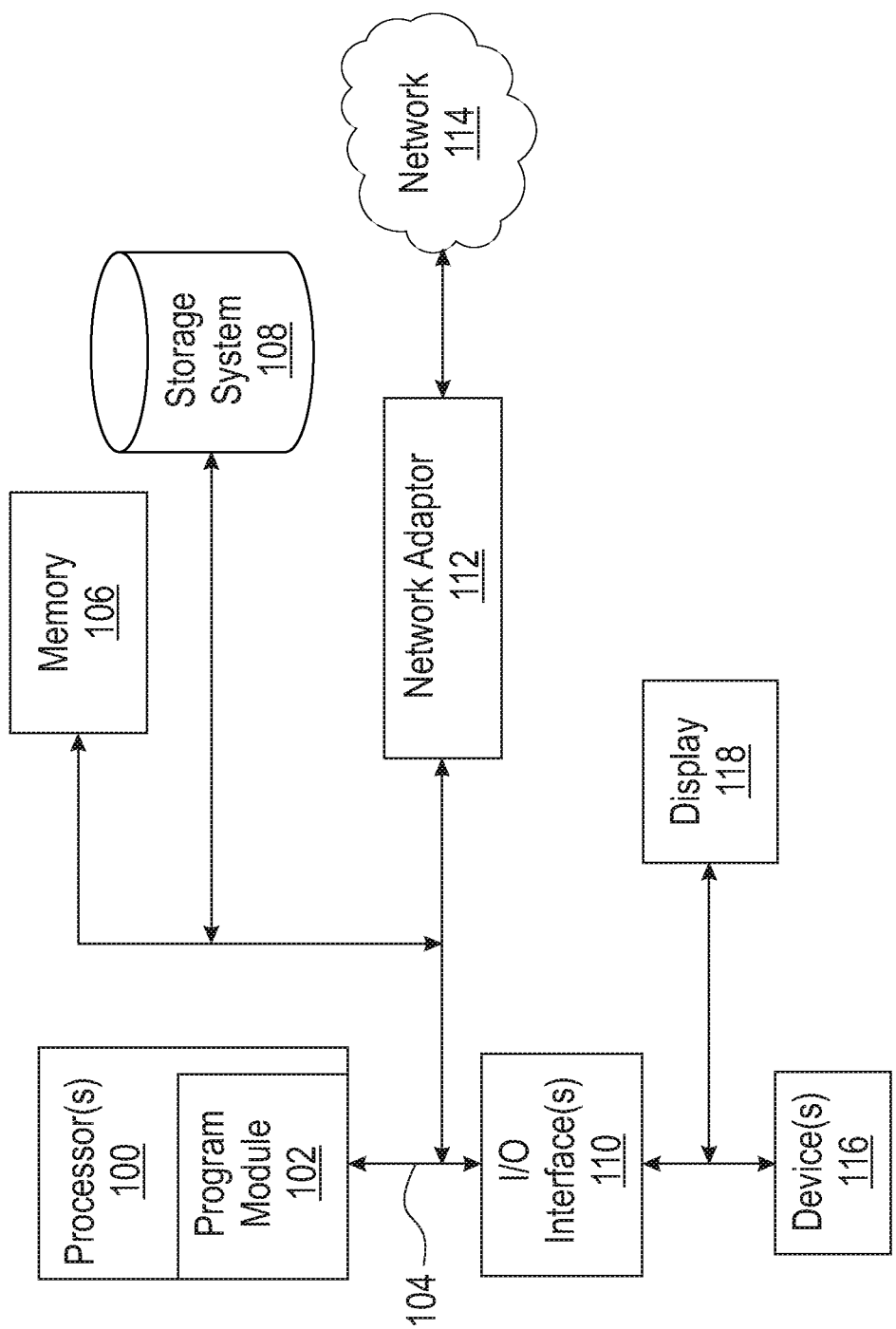
FIG. 4 is a block diagram of an exemplary computing system suitable for implementation of the embodiments of the invention disclosed in this specification.

FIG. 4 illustrates a schematic of an example computer or processing system that may implement the method for limiting application program permissions in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, mobile phones, smart phones, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A method for limiting application program permissions to access hardware or software parts of an information system comprising;
(a) receiving a request for accessing libraries of a plurality of application programs requiring a permission, the plurality of application programs being for a specific operating system;
(b) automatically extracting types of parameters and respective corresponding fields read by the libraries requiring the permission;

(c) determining the types of parameters and respective corresponding fields used by at least a threshold percentage of the libraries requiring the permission;

(d) automatically filtering the extracted types of parameters and respective corresponding fields based on a usage criteria;

(e) storing the filtered types of parameter and respective corresponding field for the permission in a database;

(f) repeating the steps (a)-(e) for each one of a plurality of permissions for a plurality of application programs for the specific operating system;

(g) determining a parameter value for the permission based on the filtered type of parameter and respective corresponding field obtained from the database;

(h) automatically parameterizing the permission to give access only to a portion of the permission based on the parameter value;

(i) storing the parameterized permissions corresponding to the parameter value in the database;

(j) downloading an application program requesting at least one of the plurality of permissions for accessing hardware or software parts of the information system;

and (k) automatically giving access to only a portion of the hardware or software parts of the information system based on the parameter value of the stored parameterized permissions of the at least one of the plurality of permissions requested by the downloading of the application program.

2. The method of claim 1, wherein step (c) includes determining the types of parameters and respective corresponding fields most often used by the libraries requiring the permission.

3. A system comprising: at least one data processor connected to at least one memory that stores software instructions, where execution of the software instructions by the at least one data processor causes the system to limit application program permissions to access hardware or software parts of an information system by:

(a) receiving a request for accessing libraries of a plurality of application programs requiring a permission, the plurality of application programs being for a specific operating system;

(b) automatically extracting types of parameters and respective corresponding fields read by the libraries requiring the permission;

(c) determining the types of parameters and respective corresponding fields used by at least a threshold percentage of the libraries requiring the permission;

(d) automatically filtering the extracted types of parameters and respective corresponding fields based on a usage criteria;

(e) storing the filtered types of parameter and respective corresponding field for the permission in a database;

(f) repeating the steps (a)-(e) for each one of a plurality of permissions for a plurality of application programs for the specific operating system;

(g) determining a parameter value for the permission based on the filtered type of parameter and respective corresponding field obtained from the database;

(h) automatically parameterizing the permission to give access only to a portion of the permission based on the parameter value;

(i) storing the parameterized permissions corresponding to the parameter value in the database;

(j) downloading an application program requesting at least one of the plurality of permissions for accessing hardware or software parts of the information system;

and (k) automatically giving access to only a portion of the hardware or software parts of the information system based on the parameter value of the stored parameterized permissions of the at least one of the plurality of permissions requested by the downloading of the application program.

4. The system of claim 3, wherein step (c) includes determining the types of parameters and respective corresponding fields most often used by the libraries requiring the permission.

5. A computer program product comprising: software instructions on a non-transitory computer-readable medium; where execution of the software instructions using a computer causes the computer to limit application program permissions to access hardware or software parts of an information system by:

(a) receiving a request for accessing libraries of a plurality of application programs requiring a permission, the plurality of application programs being for a specific operating system;

(b) automatically extracting types of parameters and respective corresponding fields read by the libraries requiring the permission;

(c) determining the types of parameters and respective corresponding fields used by at least a threshold percentage of the libraries requiring the permission;

(d) automatically filtering the extracted types of parameters and respective corresponding fields based on a usage criteria;

(e) storing the filtered types of parameter and respective corresponding field for the permission in a database;

(f) repeating the steps (a)-(e) for each one of a plurality of permissions for a plurality of application programs for the specific operating system;

(g) determining a parameter value for the permission based on the filtered type of parameter and respective corresponding field obtained from the database;

(h) automatically parameterizing the permission to give access only to a portion of the permission based on the parameter value;

(i) storing the parameterized permissions corresponding to the parameter value in the database;

(j) downloading an application program requesting at least one of the plurality of permissions for accessing hardware or software parts of the information system;

and (k) automatically giving access to only a portion of the hardware or software parts of the information system based on the parameter value of the stored parameterized permissions of the at least one of the plurality of permissions requested by the downloading of the application program.

6. The computer program product of claim 5, wherein step (c) includes determining the types of parameters and respective corresponding fields most often used by the libraries requiring the permission.

* * * * *